United States Patent
Koo et al.

(10) Patent No.: US 7,669,224 B2
(45) Date of Patent: Feb. 23, 2010

(54) ONU AND METHOD FOR CONVERTING/COMBINING FREQUENCY, AND APPARATUS AND METHOD FOR CONVERTING/COMBINING FREQUENCY IN CATV HEADEND SYSTEM

(75) Inventors: Han-Seung Koo, Daejon (KR); O-Hyung Kwon, Daejon (KR); Woongshik You, Daejon (KR); Soo-in Lee, Daejon (KR)

(73) Assignee: Electronic and Telecommunications Research Institute, Daejon (KR)

( * ) Notice: Subject to any disclaimer, the term of this patent is extended or adjusted under 35 U.S.C. 154(b) by 496 days.

(21) Appl. No.: 11/630,160

(22) PCT Filed: Dec. 30, 2004

(86) PCT No.: PCT/KR2004/003534

§ 371 (c)(1), (2), (4) Date: Dec. 20, 2006

(87) PCT Pub. No.: WO2005/125211

PCT Pub. Date: Dec. 29, 2005

(65) Prior Publication Data

US 2007/0274730 A1    Nov. 29, 2007

(30) Foreign Application Priority Data

Jun. 22, 2004    (KR) ............... 10-2004-0046749

(51) Int. Cl.
*H04N 7/22* (2006.01)

(52) U.S. Cl. .............. 725/129; 725/118; 725/119; 725/121; 725/127; 725/128; 398/66; 398/67; 398/68; 398/135; 398/138

(58) Field of Classification Search ........ 398/68–72, 398/135, 163; 725/105, 115, 118–120, 127–129
See application file for complete search history.

(56) References Cited

U.S. PATENT DOCUMENTS

| | | | | |
|---|---|---|---|---|
| 4,191,966 A | * | 3/1980 | Ovnick, Jr. | 725/151 |
| 4,484,218 A | * | 11/1984 | Boland et al. | 725/131 |
| 4,623,920 A | * | 11/1986 | Dufresne et al. | 380/240 |
| 5,488,413 A | * | 1/1996 | Elder et al. | 725/106 |
| 5,528,582 A | * | 6/1996 | Bodeep et al. | 370/276 |
| 5,818,825 A | * | 10/1998 | Corrigan et al. | 370/329 |
| 5,822,102 A | * | 10/1998 | Bodeep et al. | 398/69 |
| 5,911,019 A | * | 6/1999 | Cohen | 385/24 |
| 6,028,860 A | * | 2/2000 | Laubach et al. | 370/395.64 |
| 6,147,786 A | * | 11/2000 | Pan | 398/1 |
| 6,330,241 B1 | | 12/2001 | Fort | |
| 6,385,366 B1 | * | 5/2002 | Lin | 385/24 |
| 6,490,727 B1 | * | 12/2002 | Nazarathy et al. | 725/129 |
| 6,530,087 B1 | * | 3/2003 | Kobayashi et al. | 725/125 |
| 6,577,414 B1 | * | 6/2003 | Feldman et al. | 398/43 |
| 6,895,185 B1 | * | 5/2005 | Chung et al. | 398/72 |
| 7,007,297 B1 | * | 2/2006 | Woodward | 725/129 |
| 7,095,958 B1 | * | 8/2006 | Woodward | 398/72 |
| 7,593,639 B2 | * | 9/2009 | Farmer et al. | 398/72 |
| 2003/0007103 A1 | * | 1/2003 | Roy | 348/731 |
| 2005/0013614 A1 | * | 1/2005 | Ota et al. | 398/67 |
| 2005/0251846 A1 | * | 11/2005 | Dravida et al. | 725/129 |

FOREIGN PATENT DOCUMENTS

KR    2000-0055045 A1    9/2000

OTHER PUBLICATIONS

Naresh Chand et al., Delivery of >1 Gb/s (Digital Video, Data, and Audio) Downstream in Passband above the 155-Mb/s Baseband Services on a FTTx Full Service Access Network, IEEE Photonics Technoogy Letters, vol. 11, No. 9, Sep. 1999, pp. 1192-1194.
Naresh Chand et al., Delivery of Digital Video and Other Multimedia Services (>1 Gb/s Bandwidth) in Passband above the 155 Mb/s Baseband Services on a FTTx Full Service Access Network, Journal of Lightwave Technology, vol. 17, No. 12, Dec. 1999, pp. 2449-2460.
M. Shibutani et al., A Gigabit-To-The-Home (GTTH) system for future broadband access infrastructure, IEEE, 1997, pp. 1004-1008.

* cited by examiner

*Primary Examiner*—Ken N Vanderpuye
*Assistant Examiner*—Tanya Ngo

(74) *Attorney, Agent, or Firm*—Lowe Hauptman Ham & Berner, LLP

(57) ABSTRACT

Provided is an outdoor optical node unit (ONU) and method for converting/combining frequencies, and an apparatus and method for converting/combining frequencies in a cable television headend system. The optical node unit (ONU) includes: a downstream optic-to-electric converting unit for converting a downstream optic signal transferred through an optical cable network from a headend system to a downstream electric signal; a down frequency converting and combining unit for isolating the downstream electric signal to a broadcasting signal transmitted as a coaxial cable usable frequency band (In-Band signal) and a band signal higher than the coaxial cable usable frequency band (Super-Band (SB) signal), isolating each of channel signals in the SB signal, converting the isolated channel signals to downstream signals in a coaxial cable usable frequency band, and combining each of the frequency-converted downstream signals with the In-Band signal to generate a coaxial cable usable frequency band downstream signal; an up/down band isolating unit for outputting each of the coaxial cable usable frequency band downstream signals inputted from the down frequency converting and combining unit to a corresponding coaxial cable, or dividing an upstream signal transferred through a coaxial cable from each of subscriber's sub cells to a cable TV upstream frequency band signal and In-Band upstream channel band signal (IUC band signal) which is other upstream channel in a coaxial cable usable frequency band excepting the cable TV upstream frequency band, and outputting the cable TV upstream frequency band signal and the IUC band signal to an upstream frequency converting and combining unit; an upstream frequency converting and combining unit for converting the upstream signals which are the cable TV upstream frequency band signal and the IUC band signal inputted from the up/down band isolating unit to channels not overlapped in the coaxial cable usable frequency band, combining the converted channel signals to generate a coaxial cable usable frequency band upstream electric signal; an up electric-to-optic converting unit for receiving the optical cable usable frequency band upstream electric signal, converting the optical cable usable frequency band upstream electric signal to an upstream optical signal, and outputting the upstream optical signal to the headend system through an optical cable network; and a local oscillating unit for generating local oscillating signal for frequency-conversion, and providing the generated local oscillating signal to the down frequency converting and combining unit or the up frequency converting and combining unit.

14 Claims, 11 Drawing Sheets

ONU AND METHOD FOR CONVERTING/COMBINING FREQUENCY, AND APPARATUS AND METHOD FOR CONVERTING/COMBINING FREQUENCY IN CATV HEADEND SYSTEM

Cross Reference to Related Application

This application is the National Phase application of International Application No. PCT/KR2004/003534, filed 30 Dec. 2004, which designates the United States and was published in English. This application, in its entirety, is incorporated herein by reference.

TECHNICAL FIELD

The present invention relates to a transmission technique of a digital cable television (CATV); and, more particular, to an outdoor optical node unit (ONU) and method for converting/combining frequencies, and an apparatus and method for converting/combining frequencies in a cable television headend system, wherein the headend system converts to a band signal higher than coaxial cable usable frequency bands, a super-band (SB band) signal, and transmit the SB band signal to a coaxial cable network in case of a downstream, and the ONU transmits different downstream signals to each of subscriber's sub cells connected through the coaxial cable in case of downstream and the ONU converts upstream signals inputted through a plurality of coaxial cables to different channels in a coaxial cable usable frequency bands and transmits the converted signal to the headend system in case of a upstream.

BACKGROUND ART

FIG. 1 is a diagram showing a HFC network based a digital CATV transmission system according to the related art.

A headend system 100 receives and transmits a cable signal through a plurality of cells 121, 122, 123 and a hybrid fiber coaxial (HFC) network 150.

The HFC network 150 is configured with an optical cable network 130 and a coaxial cable network 140. Optical node units 111, 112, 113 in the HFC network 150 convert an optical signal to an electric signal or convert the electric signal to the optical signal.

When a conventional digital CATV transmission system transmits a cable signal, the headend system 100 modulates a signal using a cable MODEM and converts the modulated signal to a predetermined frequency band. After converting, the headend system 100 combines the converted signal with broadcasting signals of other channels and transmits the combined signals to an optical cable network 130 through an electric-to-optical converter. The broadcasting signals of other channels are In-Band signals which are broadcasting signals in a coaxial cable usable frequency band.

The modulated and combined signals reach to the outdoor optical node units (ONU) 111, 112 and 113 through the optical cable network 130. Then, the ONUs 111, 112 and 113 converts an optical signal to an electric signal and outputs the converted signal to the coaxial cable network 140 through one or more coaxial cables. Finally, subscribers receive the cable signal through the coaxial cable network 140.

Such a conventional outdoor optical node unit (ONU) is a device for connecting an optical cable network and a coaxial cable network in a HFC network. As described above, the conventional ONU simply relays a downstream/upstream signal by converting an optical signal to an electric signal. That is, the conventional ONU simply connects the optical cable network and the coaxial cable network converting the optical signal to the electric signal or converting the electric signal to the optical signal.

However, it is ineffective in a view of a transmission efficiency since sub cells connected to one outdoor ONU receives signals identical to cable signals transmitted to other sub cells in case of transmitting of a downstream signal.

That is, the conventional outdoor ONU divides a signal as many as the number of connected coaxial cables and transmits the divided signals. When transmitting the signals, a signal transmitted to a predetermined substrate included in a predetermined sub cell is also broadcasted to other subscribers through all of coaxial cables connected to the corresponding outdoor ONU. Therefore, it is very ineffective in a view of an efficiency of using a frequency.

In order to overcome the inefficiency program and improve the transmission efficiency, a conventional cell division scheme was introduced. The conventional cell division scheme divides the cells to a plurality of sub cells. However, the conventional cell division scheme requires a mass amount of expenses in a view of economic and time.

In case of transmitting an upstream signal, the conventional outdoor ONU receives upstream signals transmitted from substrates through one or more coaxial cables in 5 to 42 MHz bands, combines the received upstream signals, and transmits the combined signals to a cable MODEM of the headend system. However, cable signals inputted through different coaxial cables are often collided. Accordingly, the transmission efficiency is degraded.

Furthermore, resources of upstream channels are reduced in proportional to the number of subscribers in each cell because subscribers in a corresponding cell share upstream frequency channels assigned within a frequency range for a conventional cable TV system.

Moreover, a conventional digital CATV transmission system ineffectively uses a network resource because the conventional digital CATV transmission system uses a band same to a coaxial cable useable frequency band although an optical cable network between the headend and the outdoor optical node unit has a higher usable frequency band than a coaxial cable network.

DISCLOSURE

Technical Problem

It is, therefore, an object of the present invention to provide an outdoor optical node unit and method for converting/combining frequencies to improve a transmission efficiency by transmitting different downstream signals to each of subscribers' sub cells connected through an optical cable in case of a downstream; or converting upstream signals inputted through a plurality of coaxial cables to difference channels and transmitting to a headend in case of a upstream.

It is another object of the present invention to provide an apparatus and method for converting/combining frequencies in a cable TV headend system to improve a transmission efficiency by converting a downstream signal to a coaxial cable useable frequency band, which is a super-band (SB) signal, and transmitting the converted downstream signal to an optical cable network in case of a downstream; or dividing a coaxial cable usable frequency band to a plurality of upstream channels and transmitting the upstream signals to different sub cells through each of the upstream channels in case of a upstream.

Technical Solution

In accordance with one aspect of the present invention, there is provided an optical node unit (ONU) of converting and combining a frequency for outdoor in a hybrid fiber coaxial (HFC) network, the optical node unit including: a downstream optic-to-electric converting unit for converting a downstream optic signal transferred through an optical cable network from a headend system to a downstream electric signal; a down frequency converting and combining unit for isolating the downstream electric signal to a broadcasting signal transmitted as a coaxial cable usable frequency band (In-Band signal) and a band signal higher than the coaxial cable usable frequency band (Super-Band (SB) signal), isolating each of channel signals in the SB signal, converting the isolated channel signals to downstream signals in a coaxial cable usable frequency band, and combining each of the frequency-converted downstream signals with the In-Band signal to generate a coaxial cable usable frequency band downstream signal; an up/down band isolating unit for outputting each of the coaxial cable usable frequency band downstream signals inputted from the down frequency converting and combining unit to a corresponding coaxial cable, or dividing an upstream signal transferred through a coaxial cable from each of subscriber's sub cells to a cable TV upstream frequency band signal and In-Band upstream channel band signal (IUC band signal) which is other upstream channel in a coaxial cable usable frequency band excepting the cable TV upstream frequency band, and outputting the cable TV upstream frequency band signal and the IUC band signal to an upstream frequency converting and combining unit; an upstream frequency converting and combining unit for converting the upstream signals which are the cable TV upstream frequency band signal and the IUC band signal inputted from the up/down band isolating unit to channels not overlapped in the coaxial cable usable frequency band, combining the converted channel signals to generate a coaxial cable usable frequency band upstream electric signal; an up electric-to-optic converting unit for receiving the optical cable usable frequency band upstream electric signal, converting the optical cable usable frequency band upstream electric signal to an upstream optical signal, and outputting the upstream optical signal to the headend system through an optical cable network; and a local oscillating unit for generating local oscillating signal for frequency-conversion, and providing the generated local oscillating signal to the down frequency converting and combining unit or the up frequency converting and combining unit.

In accordance with another aspect of the present invention, there is provided an apparatus of converting and combining a frequency in a HFC network based cable TV headend system, the apparatus including: an up-converting unit for receiving a plurality of downstream signals from a cable MODEM of the headend system, and converting the downstream signals to super-band signals (SB) higher than a coaxial cable usable frequency band; a frequency combining unit for combining the SB downstream signals from the up-converting unit and broadcasting signals in a coaxial cable usable frequency band (In-Band signal); an electric-to-optic converting unit for converting the downstream electric signals outputted from the frequency combining unit to downstream optic signals; an optic-to-electric converting unit for converting an upstream optic signal transferred from an optical node unit (ONU) through an optical cable network to an upstream electric signal; a frequency dividing unit for dividing the upstream electric signal from the optic-to-electric converting unit to each of channels; and a down-converting unit for down-converting each of the upstream electric signals divided at the frequency dividing unit to intermediate frequency (IF) signals, and outputting the IF signal to the cable MODEM.

In accordance with still another aspect of the present invention, there is provided a method of converting and combining a frequency in an optical node unit for outdoor in a HFC network, the method including the steps of: a) converting downstream optic signals transferred from a headend system through an optic cable network to downstream electric signals; b) isolating a broadcasting signal in a coaxial cable usable frequency band (In-Band signal) and a band signal higher than a coaxial cable usable frequency band (Super-Band (SB) signal) from the downstream electric signal, isolating each of channel signals included in the SB signal, converting the isolated channel signals to downstream signal in a coaxial cable usable frequency band, and combining each of the downstream signals with the In-Band signal to generate a coaxial cable usable frequency band downstream signal; and c) outputting each of the coaxial cable usable frequency band downstream signals to a corresponding coaxial cable.

In accordance with further another aspect of the present invention, there is provided a method of converting and combining a frequency in an optical node unit for outdoor in a HFC network, the method including the steps of: a) dividing an upstream signal transferred through a coaxial cable from each of subscriber's sub cells to a cable TV upstream frequency band signal and other upstream channel in a coaxial cable usable frequency band excepting the cable TV upstream frequency band which is In-Band upstream channel band signal (IUC band signal); b) converting the upstream signals which are the cable TV upstream frequency band signal and the IUC band signal to channels not overlapped in the coaxial cable usable frequency band, combining the converted channel signals to generate a coaxial cable usable frequency band upstream electric signal; and c) converting the generated coaxial cable usable frequency band upstream electric signal to an upstream optic signal for transmitting the upstream electric signal to the headend system through the optical cable network.

In accordance with further still another aspect of the present invention, there is provided a method of converting and combining a frequency in a HFC network based cable TV headend system, the method including the steps of: a) up-converting a plurality of downstream signals transmitted from a cable MODEM of the headend system to band signals higher than a coaxial cable usable frequency band (SB signal); b) combining the SB band downstream signal converted in the step a) with a broadcasting signal in a coaxial cable usable frequency band (In-Band signal); and c) converting the downstream electric signal combined in the step b) to a downstream optic signal to transmit the downstream electric signal to an optical cable network.

In accordance with even further still another aspect of the present invention, there is a provided a method of converting and combining a frequency in a HFC network based cable TV headend system, the method including the steps of: a) converting an upstream optic signal transferred from an optical node unit (ONU) for outdoor through an optical cable network to an upstream electric signal; b) dividing the upstream electric signal according to channels; and c) down-converting each of the upstream electric signals divided in the step b) to intermediate frequency (IF) signals.

Advantageous Effects

The digital CATV transmission system according to present invention transmits different downstream signals to sub cells in a cell differently from a conventional method that divides the cell to a plurality of small cells. Therefore, the digital CATV transmission system according to the present invention increases a transmission speed without requiring a mass amount of economic expenses and time for dividing the cell to the plurality of small cells.

Also, the present invention transmits different cable signals, downstream signals, to each of coaxial cables for transmitting only signals related to each of the coaxial cables to corresponding coaxial cable. Therefore, the present invention improves a transmission efficiency. For example, if an ONU is connected to four different coaxial cables, the present invention provides four times improved transmission efficiency compared to a conventional system.

Furthermore, the present invention transmits a cable signal, a downstream signal to subscribers using high usable frequency band of an optical cable network. Therefore, usability of network resources and transmission efficiency are improved.

Moreover, the present invention multiplexes upstream signals in a typical cable TV upstream frequency bands which is in an upstream band range from 5 MHz to 42 MHz and IUC signal (In-Band Upstream Channel) within a coaxial cable usable frequency band. Therefore, the upstream signal is transmitted effectively.

Also, the present invention converts upstream signals inputted through each of coaxial cables connected to an outdoor ONU (optical node unit) to frequencies not to be overlapped with other channels, which are IUCs, in a coaxial cable usable frequency band in the outdoor ONU. Therefore, the present invention improves a transmission efficiency by preventing collusion between cable signals.

Furthermore, the present invention transfers an upstream signal through not only upstream bands from 5 MHz to 42 MHz but also an IUC band. Therefore, the present invention uses an existing IUC band as an upstream channel without requiring supplementary operations to transfer the upstream signal when using of the existing IUC band is required to increase a transmission speed.

Moreover, the present invention transmits and receives cable signals without modifying a coaxial cable network equipments including a receiving terminal because a cable signal is transferred on a band same to an existing frequency band in a coaxial cable network.

As described above, the present invention transmits a cable signal in a SB (super-band) for a downstream and transmits a cable signal in a coaxial cable usable frequency band for an upstream on an optical cable network between a headend and an outdoor ONU, and transfers a cable signal in a band same to an existing frequency band in a coaxial cable network. Therefore, the present invention improves a usability of network resources and transmission efficiency. Also, the present invention transmits and receives a cable signal without modifying a coaxial cable network including a receiving terminal.

DESCRIPTION OF DRAWINGS

The above and other objects and features of the present invention will become apparent from the following description of the preferred embodiments given in conjunction with the accompanying drawings, in which.

BEST MODE FOR THE INVENTION

In case of downstream in the present invention, a high usable frequency band of an optical cable network between a headend and an outdoor optical node unit (ONU) is used. Theoretically, the usable frequency bands of the optical cable are from 0 to 20 GHz. The usable frequency band of the optical cable is much higher than usable frequency bands of a coaxial cable which are from 0 to 863 MHz. Therefore, frequency bands among optical cable's usable frequencies higher than a coaxial cable usable frequency band are used in the present invention. In order to use the higher frequency bands, a headend system according to the present invention converts a frequency for one or more cable signal channels not to be overlapped in a SB (super-band) using an up-converter converting a frequency to the SB. After converting, an electric-to-optical converter transmits a downstream cable signal to an optical cable network using a laser diode that electric-to-optical converts to the SB. After transmitting, an outdoor ONU converts the downstream cable signals transmitted through a SB channel to a predetermined channel in a coaxial cable usable frequency band and outputs other coaxial cables connected to the outdoor ONU. Herein, a cable MODEM of a headend previously selects one of sub cells to transmit a predetermined channel signal by a subscriber's management.

In case of upstream in the present invention, the outdoor ONU receives upstream signals through one or more coaxial cables and converts the received upstream signals to different channels among coaxial cable usable frequency bands. After converting, the outdoor ONU combines the frequency-converted signals and outputs the combined signals to the optical cable network. Then, a down-converter of headend coverts upstream signals transmitted as a coaxial cable usable frequency band to an intermediate frequency band and outputs the converted signals to a cable MODEM. Especially, an IUC (In-Band Upstream Channel) in a coaxial cable usable frequency band is also supported as an upstream channel excepting a cable TV upstream frequency bands from 5 to 42 MHz which are currently used as a transmission band in an outdoor ONU according to the present invention.

Other objects and aspects of the invention will become apparent from the following description of the embodiments with reference to the accompanying drawings, which is set forth hereinafter.

Figure 1:
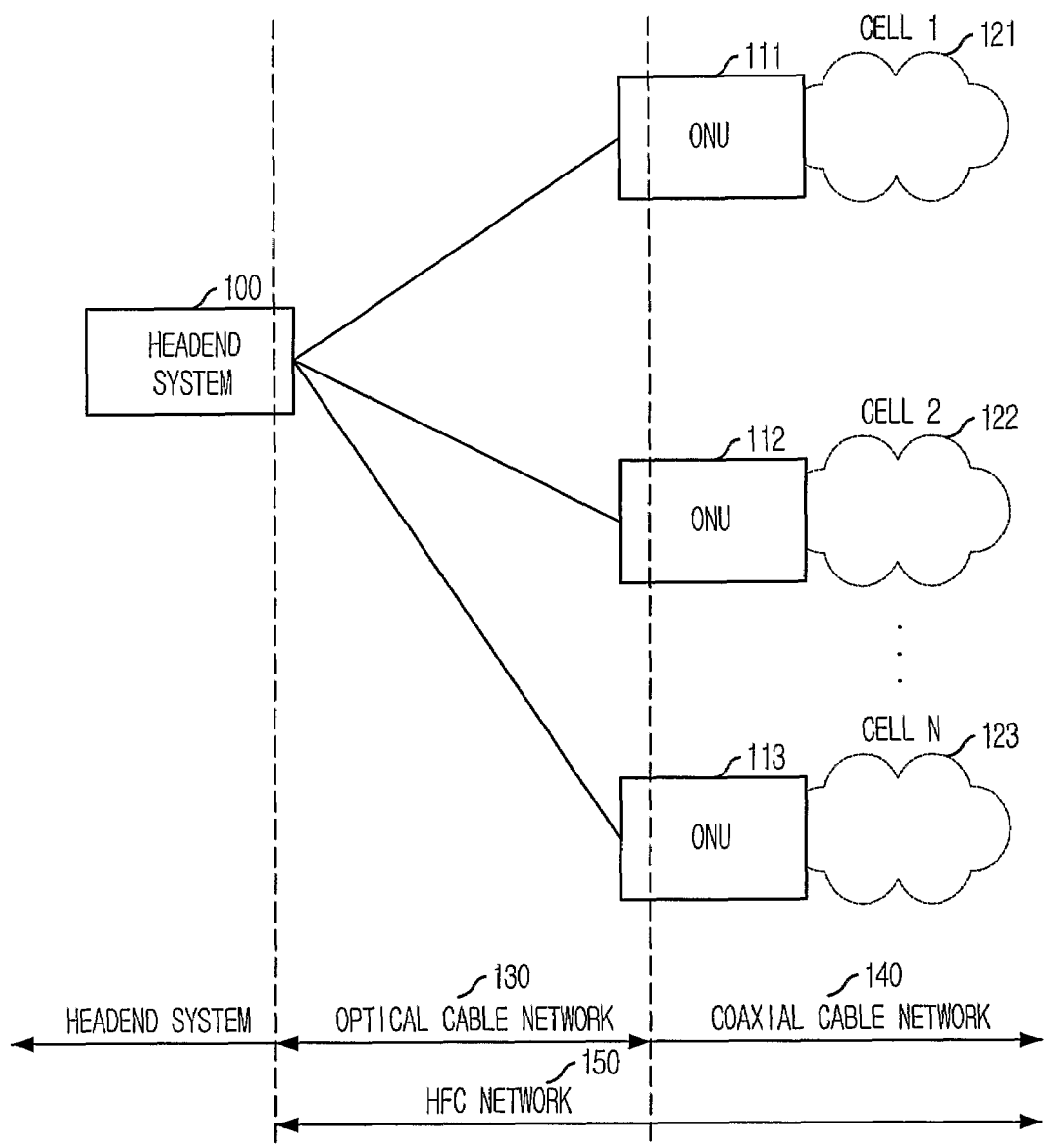
FIG. 1 is a block diagram illustrating a conventional digital CATV transmission system in a HFC network.
Figure 2:
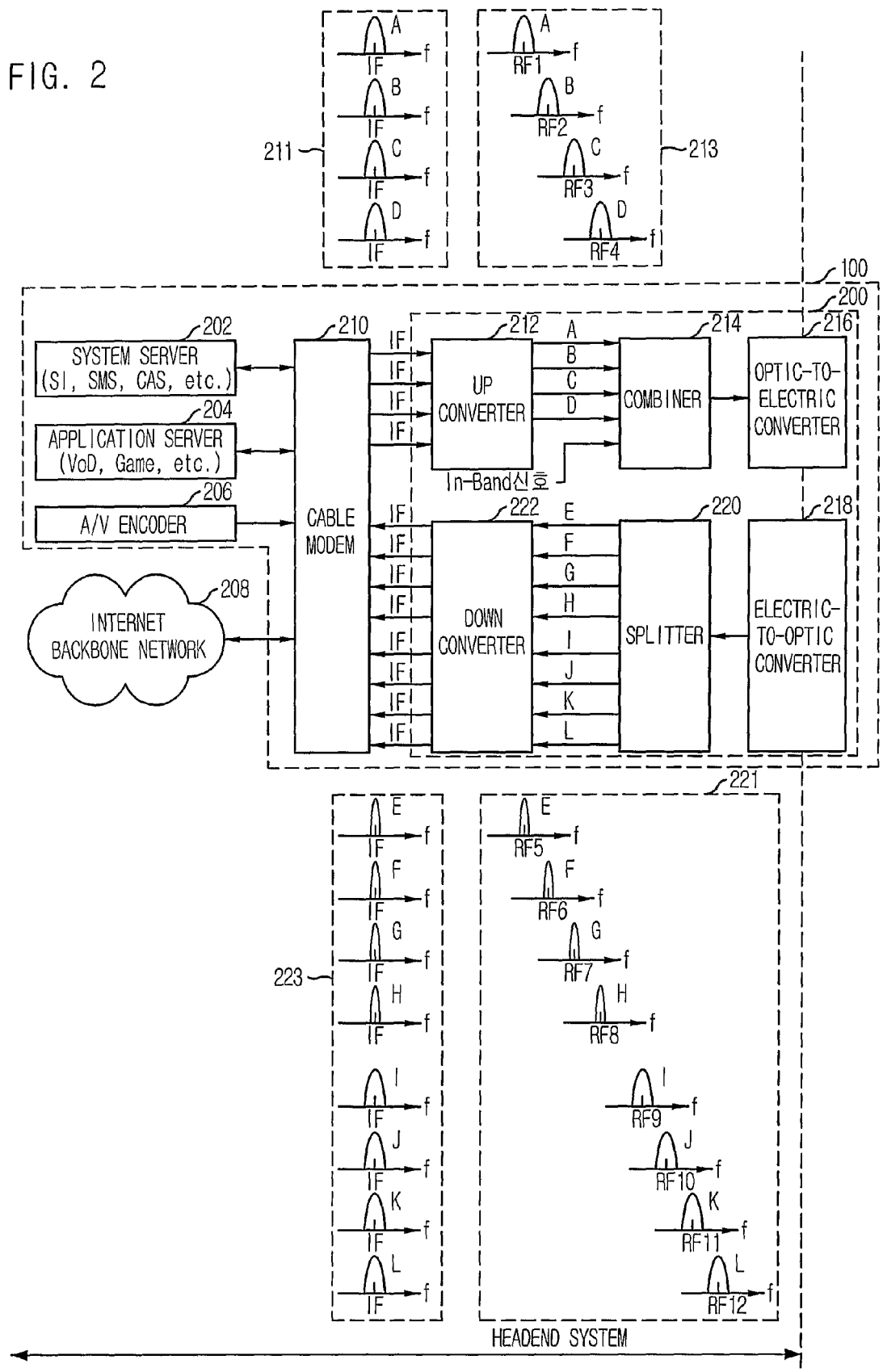
FIGS. 2 and 3 are block diagrams showing an output optical node unit and method for converting/combining frequencies and an apparatus and method for converting/combining frequencies in a cable TV headend system in accordance with a preferred embodiment of the present invention.
Figure 3:
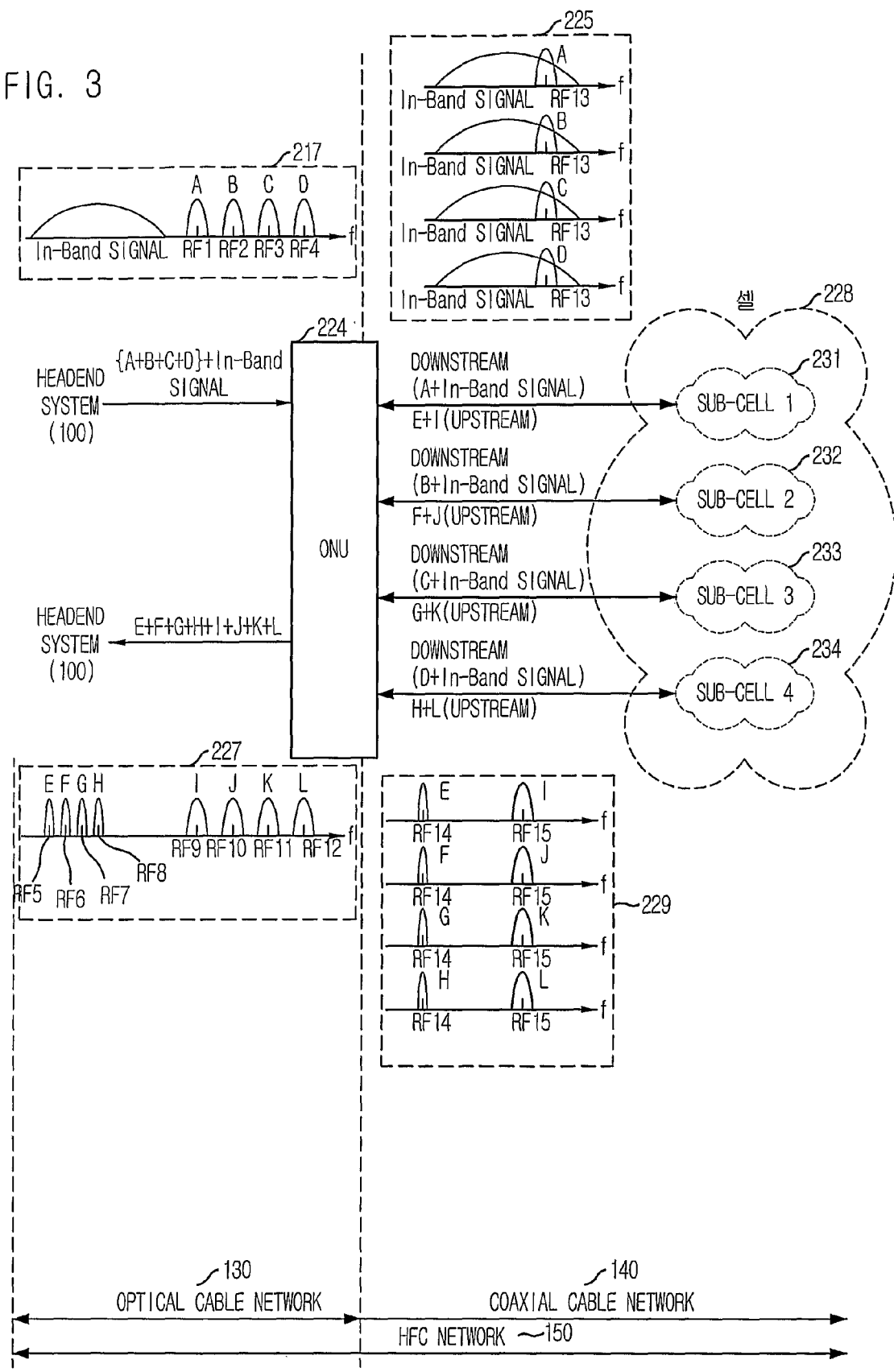

FIGS. 2 and 3 are block diagrams showing an output optical node unit and method for converting/combining frequencies and an apparatus and method for converting/combining frequencies in a cable TV headend system in accordance with a preferred embodiment of the present invention. That is, FIGS. 2 and 3 show an output optical node unit and method for converting/combining frequencies and an apparatus and method for converting/combining frequencies in a cable TV headend system in one cell. Herein, in order to conveniently describe the present invention, four downstream channels A, B, C, D and eight upstream channels E, F, G, H, I, J, K, L are transmitted. Also, the eight upstream channels are configured with four channels E, F, G, H using upstream bands from 5 to 42 MHz and four In-Band Upstream channels I, J, K and L as an example of an embodiment of the present invention.

Referring to FIGS. 2 and 3, the frequency converting/combining apparatus 200 in a digital cable TV headend system includes an up-converter 212, a combiner 214, an optic-to-electric converter 216, an electric-to-optic converter 218, a splitter 220 and a down converter 222. Hereinafter, functions of each element of the frequency converting/combining apparatus 200 will be explained with describing steps of downstream transmission and upstream transmission.

A cable MODEM 210 of the headend system 100 receives data to be transmitted to subscribers through a system server 202 such as SI, SMS, or CAS, an application server 204 such as a VOD server, or a game server, an audio/video (A/V) encoder 206, and an internet backbone 208. The cable MODEM 210 maps the input data to a plurality of sub cells 231, 232, 233, 234 in one to one manner, and outputs the mapped data to downstream channels A, B, C, D through four intermediate frequency (IF) output ports as shown in a numeral reference 211 in FIG. 2. Herein, the references 'A', 'B', 'C' and 'D' represent IF downstream signals.

The up converter 212 converts each of downstream channels inputted from the cable MODEM 210 to a super-band (SB) as shown in a numeral reference 213 in FIG. 2. The SB represents a band higher than a coaxial cable usable frequency band. The output signal are shown as an A[RF1], a B[RF2], a C[RF3], and a D[RF4] in FIG. 2, and RF1, RF2, RF3 and RF4 denote downstream RF signals having a center frequency existed in the SB.

The combiner 213 combines the downstream SB channels inputted from the up-converter 212 with an In-Band signal which is a broadcasting signal in a coaxial cable usable frequency band, and outputs the combined signal as shown in a number reference 217 in FIG. 2. The electric-to-optic converter 216 converts the combined signal from the combiner 213 to a downstream optic signal, and outputs the downstream optic signal to an outdoor optical node unit (ONU) 224 as shown in a number reference 217 ({A[RF1]+B[RF2]+C[RF3]+D[RF4]+In-Band signal}. Herein, RF1, RF2, RF3 and RF4 denote downstream RF signals having a center frequency existed in the SB.

The outdoor ONU 224 converts each of the downstream signals transmitted through the SB from the electric-to-optic converter 216 through an optical cable network 130 to a coaxial cable usable frequency band. Herein, a center frequency of the downstream signal is [RF13] MHz which is a value in a coaxial cable usable frequency band.

After then, the ONU 224 combines the four downstream channels, which are converted to have a center frequency of [RF13] MHz, with the In-Band signal, which is a broadcasting signal in a coaxial cable usable frequency band, and outputs the combined signal to corresponding sub cells 231, 232, 233, 234 through related coaxial cables as shown in a number reference 225 in FIG. 2.

That is, the ONU 224 transmits a signal 'A[RF13]+In-Band signal (broadcasting signal in a coaxial cable usable frequency band)' to the sub cell 231, a signal 'B[RF13]+In-Band signal (broadcasting signal in a coaxial cable usable frequency band)' to the sub cell 232, a signal 'C[RF13]+In-Band signal(broadcasting signal in a coaxial cable usable frequency band)' to the sub cell 233, and a signal 'D[RF13]+In-Band signal (broadcasting signal in a coaxial cable usable frequency band)' to the sub cell 234. Herein, the RF13 denotes a downstream RF signal having a center frequency in a coaxial cable usable frequency band.

Hereinafter, transmission of upstream signal from a subscriber in a sub cell to a headend system 100 through the ONU 224 will be described.

The ONU 224 receives upstream channels E, F, G, H using upstream bands from 5 to 42 MHz from sub cells 231, 232, 233, 234, and also receives ICUs I, J, K, L using other bands through four coaxial cables as shown in a numeral reference 229. That is, the ONU 224 receives a signal 'E[RF14]+I[RF15]' from a sub cell 231, a signal 'F[RF14]+J[RF15]' from a sub cell 232, a signal 'G[RF14]+K[RF15]' from a sub cell 233, and a signal 'H[RF14]+L[RF15]' from a sub cell 234. Herein, the RF 14 denotes an upstream RF signal having a center frequency from 5 to 42 MHz, and the RF 15 denotes an upstream signal in a coaxial cable usable frequency band excepting a signal having a center frequency from 5 to 42 MHz.

The ONU 224 converts each of the input signals E[RF14], F[RF14], G[RF14], H[RF14], I[RF15], J[RF15], K[RF15], L[RF15] from sub cells 231, 232, 233, 234 through a coaxial cable network 140 to signals in a coaxial cable usable frequency band, and combines the converted signals as shown in a numeral reference 227. After then, the combined signals are outputted to the headend system. Herein, the output signals of the ONU 224 are shown in a numeral reference 227 as E[RF5], F[RF6], G[RF7], H[RF8], I[RF9], J[RF10], K[RF11], and L[RF12]. And, RF5 to RF 12 denote upstream signals having a center frequency in upstream bands from 5 to 42 MHz and in a coaxial cable usable frequency band.

The optic-to-electric converter 218 receives frequency multiplexed upstream signals 227 from the ONU 224 through an optical cable network 130, converts the received signals to electric signals, and outputs the electric signals to the splitter 220.

The splitter 220 splits the multiplexed upstream electric signals to eight signals (E[RF5], F[RF6], G[RF7], H[RF8], I[RF9], J[RF10], K[RF11], L[RF12]) as shown in a numeral reference 221, and outputs the eight signals to the down-converter 222. Herein, RF5 to RF12 denote upstream signals having a center frequency in upstream bands from 5 to 42 MHz and in a coaxial cable usable frequency band.

The down-converter 222 down-converts the upstream electric signals inputted from the splitter 220 to intermediate frequency (IF) signals and outputs the IF signals to the cable MODEM 210. Herein, the output signals of the down-converter 222 are eight IF upstream signals shown in a number reference 223 as E, F, G, H, I, J, K, and L.

The cable MODEM 210 outputs the input upstream signals (223) to corresponding units such as the system server 202, the application server 204 and the internet backbone 208.

Figure 4:
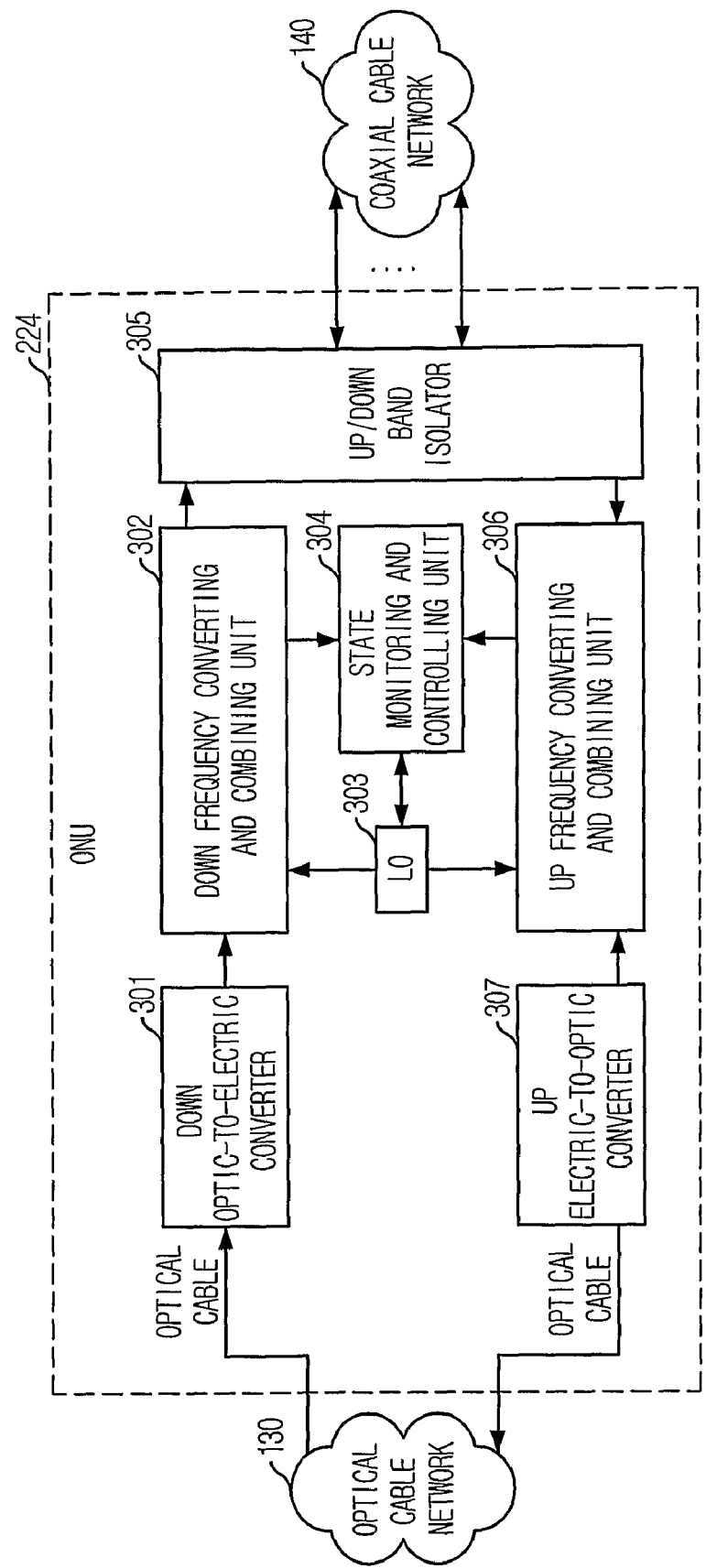
FIG. 4 is a block diagram depicting an output optical node unit (ONU) for converting/combining frequencies in accordance with a preferred embodiment of the present invention.

FIG. 4 is a block diagram depicting an output optical node unit (ONU) for converting/combining frequencies in accordance with a preferred embodiment of the present invention.

Referring to FIG. 4, the ONU 224 for converting/combining a frequency includes a down optic-to-electric converter 301, a down frequency converting and combining unit 302, a local oscillator 303, a state monitoring and controlling unit 304, a up/down band isolator, an up frequency converting and combining unit 306, and an up electric-to-optic converter 307.

In FIGS. 2 and 3, four downstream channel and eight upstream channels are shown, but in FIG. 4, four channels E, F, G, H using upstream frequencies from 5 to 42 MHz and another four channels I, J, K, L using IUC.

The down optic-to-electric converter 301 receives downstream optic signals including In-Band signals and SB signals from the optical cable network 130, converts the received signals to downstream electric signals, and outputs the downstream electric signals to the down frequency converting and combining unit 302. As described above, the In-Band signals are broadcasting signals in a coaxial cable usable frequency band.

The down frequency converting and combining unit 302 receives SB RF signals outputted from the down electric-to-optic converter 301, converts four downstream channels 217 in SB to signals 225 having a center frequency in a coaxial cable usable frequency band, and outputs the converted signals to the up/down band isolator 305. Herein, a local oscillating frequency for converting a frequency is received from the local oscillator 303, and a state signal is outputted to the state monitoring and controlling unit 304 for monitoring a signal.

The up frequency converting and combining unit 306 receives upstream signals 229 inputted from the up/down band isolator 305 as upstream band signals from 5 to 42 MHz and IUC band upstream signals, and converts the upstream signals 229 to eight channels not to overlapped in a coaxial cable usable frequency band. Herein, a local oscillating frequency for converting a frequency is received from the local oscillator 303, and a state signal is outputted to the state monitoring and controlling unit 304 for monitoring a signal.

The up electric-to-optic converter 307 receives upstream electric signals in a coaxial cable usable frequency band from the up frequency converting and combining unit 306, converts the upstream electric signals to optic signals, and outputs the optic signals to the optical cable network 130.

The local oscillator 303 generates the local oscillating frequency required for converting a frequency in the down frequency converting and combining unit 302 and the up frequency converting and combining unit 306, and transmits the generated local oscillating frequency to the down frequency converting and combining unit 302 and the up frequency converting and combining unit 306.

The state monitoring and controlling unit 304 receives state information from the down frequency converting and combining unit 302 and the up frequency converting and combining unit 306, and outputs the state information to meters. Also, the state monitoring and controlling unit 304 outputs controlling information to the local oscillator 303 for generating the local oscillating frequency.

The up/down band isolator 305 outputs four downstream signals belonged in a coaxial cable usable frequency band inputted from the down frequency converting and combining unit 302, and outputs upstream signals belonged in 5 to 42 MHz and IUC band inputted from each of sub cells 231, 232, 233, 234 through coaxial cables to the upstream frequency converting and combining unit 306.

Figure 5:
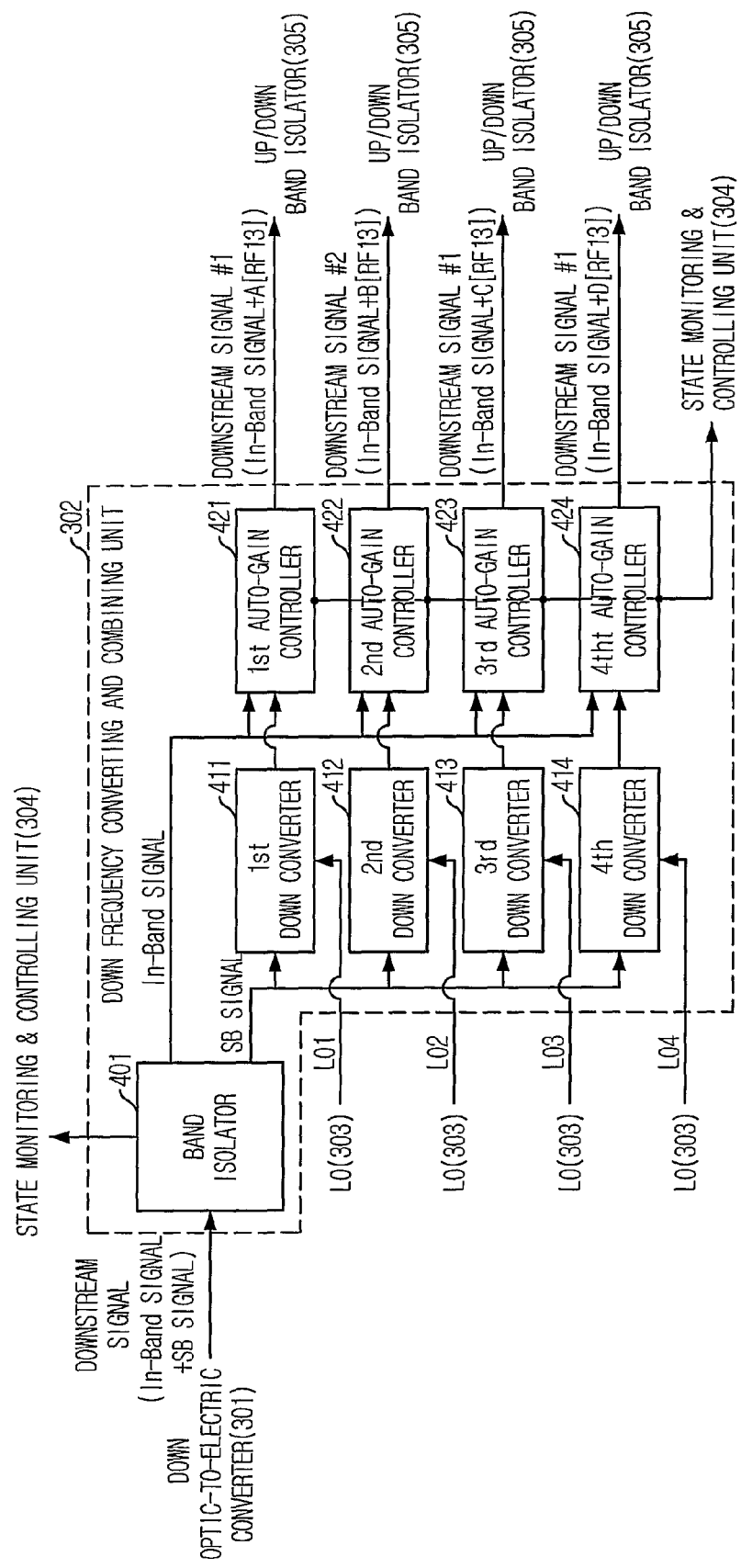
FIG. 5 is a block diagram illustrating a down frequency converting and mixing unit shown in FIG. 4.

FIG. 5 is a block diagram illustrating a down frequency converting and mixing unit shown in FIG. 4.

As shown in FIG. 5, the down frequency converting and combining unit 302 includes a band isolator 401, a plurality of down-converters (DC) 411, 412, 413, 414, and a plurality of auto-gain controller (AGC) 421, 422, 423, 424.

For convenience, four downstream channels and eight upstream channels are shown in FIG. 5 and eight upstream channels includes four upstream channels E, F, G, H using upstream bands from 5 to 42 MHz and four upstream channels I, J, K, L using IUC band.

The band isolator 401 receives coaxial cable usable frequency band signals and SB signals from the down optic-to-electric converter 301, isolates In-Band signals in a coaxial cable usable frequency band and downstream signals in the SB, and outputs the isolated signals. Herein, the downstream signals in the SB are isolated four signals and outputted. And, the inputted signals may be outputted to the state monitoring and controlling unit 304.

The first down converter (DC) 411 receives a SB signal from the band isolator 401, extracts a first channel in the SB from the SB signals using a BPF and converts the extracted first channel to a signal having a center frequency of RF13 using a mixer. The extracted first channel is converted to have a center frequency in a coaxial cable usable frequency. Then, the first DC 411 outputs the frequency-converted channel to the first auto-gain controller (AGC) 421. Herein, the mixer uses a local oscillating frequency LO1 inputted from the local oscillator 303 for converting a frequency.

The second DC 412, the third DC 413, and fourth DC 414 perform operations identical to the first DC 411. That is, a second channel, a third channel and a fourth channel in the SB are converted to signals having a center frequency of [RF13], and the frequency-converted signals are outputted to corresponding AGCs 422, 423, 424, respectively.

The first AGC 421 receives a channel A having a center frequency of RF13 from the first DC 411, generates coaxial cable usable frequency band downstream signal by combining the received channel A with the In-Band signals inputted from the band isolator 401, and outputs the generated downstream signals (In-Band signal+A[RF13]) to the up/down band isolator 305 with constantly maintaining a signal level of the downstream signals. The output signals may be outputted to the state monitoring and controlling unit 304.

The second AGC 422, the third AGC 423 and the fourth AGC 424 performs operations same to the first AGC 421.

Figure 6:
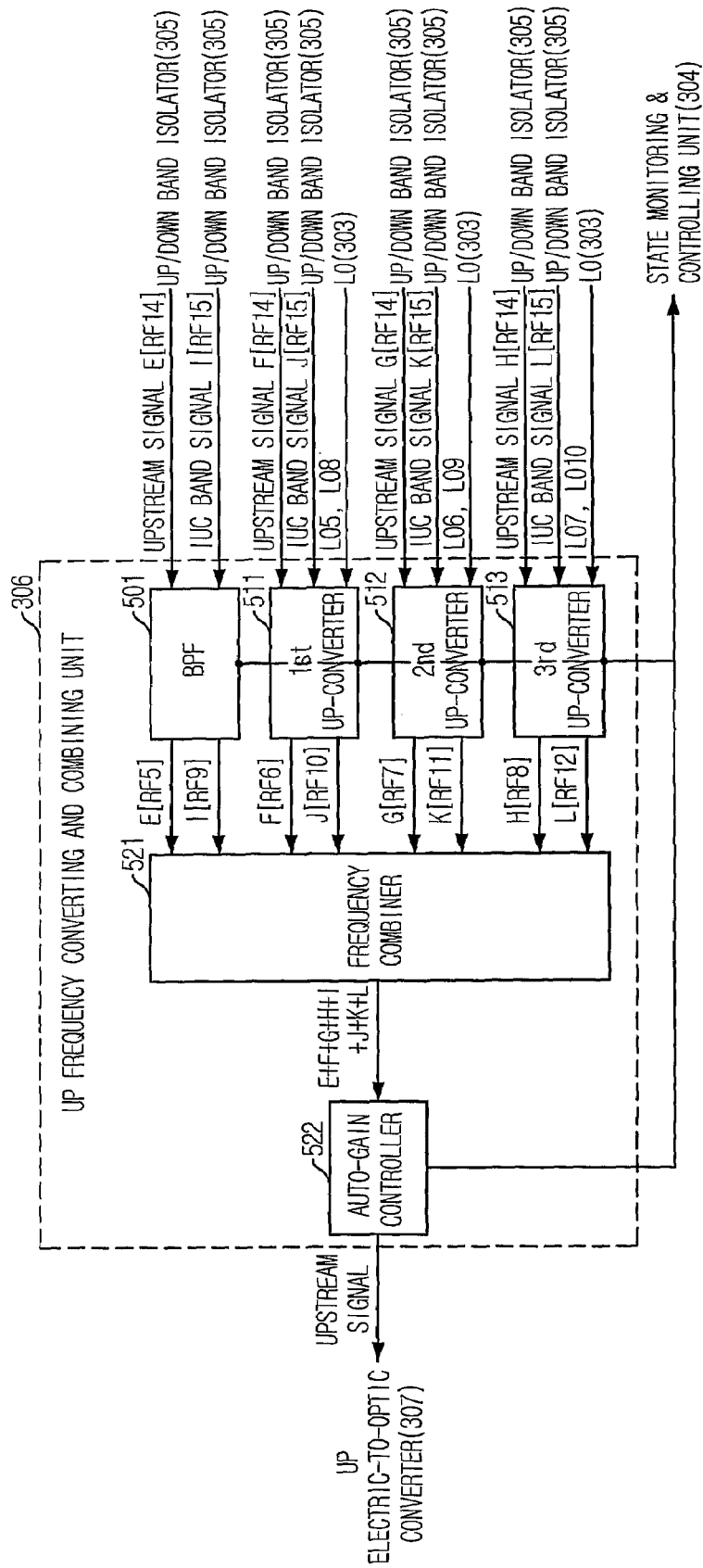
FIG. 6 is a block diagram showing an up frequency converting and mixing unit shown in FIG. 4.

FIG. 6 is a block diagram showing an up frequency converting and mixing unit shown in FIG. 4.

As shown in FIG. 6, the up frequency converting and combining unit 206 includes a band-pass filter (BPF) 501, a first up-converter (UC) 511, a second UC 152, a third UC 513, a combiner 521 and an AGC 522.

For convenience, four downstream channels and eight upstream channels are shown in FIG. 6. Herein, eight upstream channels include four channels E, F, G, H using upstream bands from 5 to 42 MHz and another four channels I, J, K, L using IUC band.

The BPF 501 is configured with a BPF for IUC band and a BPF for upstream signal band. The BPF 501 receives IUC band signal I[RF15] and upstream signals E[RF14] from the first up/down band isolator 801, performing a filtering on each of signals using the BPF of IUC band and the BPF for upstream signal band to get filtering results as I[RF9] and E[RF5], and outputs the filtering results to the frequency combiner 521. Also, the BPF 501 may output the input signals to the state monitoring and controlling unit 304.

The first UC 511 receives the IUC band signal J[RF15] and the upstream signal F[RF14] from the second up/down band isolator 802, and also receives local oscillating frequencies LO5 and LO8 from the local oscillator 303. The first UC 511 the upstream signal to a channel F having a center frequency of RF6 (227 in FIG. 3) using a mixer and LO5, and outputs the channel F to the frequency combiner 521. Also, the first UC 511 converts the IUC band signal to a channel J having a center frequency of RF10 (227 in FIG. 3) using a mixer and LO8, and outputs the channel F to the frequency combiner 521. And, the input signals may be outputted to the state monitoring and controlling unit 304.

The second UC 512 and the third UC 513 also perform same operations compared to the first UC 511.

The frequency combiner 521 receives the frequency-converted upstream signals and IUC band signals from the BPF 501, the first UC 511, the second UC 512 and the third UC 513, generates upstream electric signals of coaxial cable usable frequency band by combining the received signals, and output the generated upstream electric signals (E+F+G+H+I+J+K+L) to the AGC 522.

The AGC 522 outputs signals inputted from the frequency combiner 521 with constantly maintaining a level of the input signals. Also, the AGC 522 may output the signals to the state monitoring and controlling unit 304.

Figure 7:
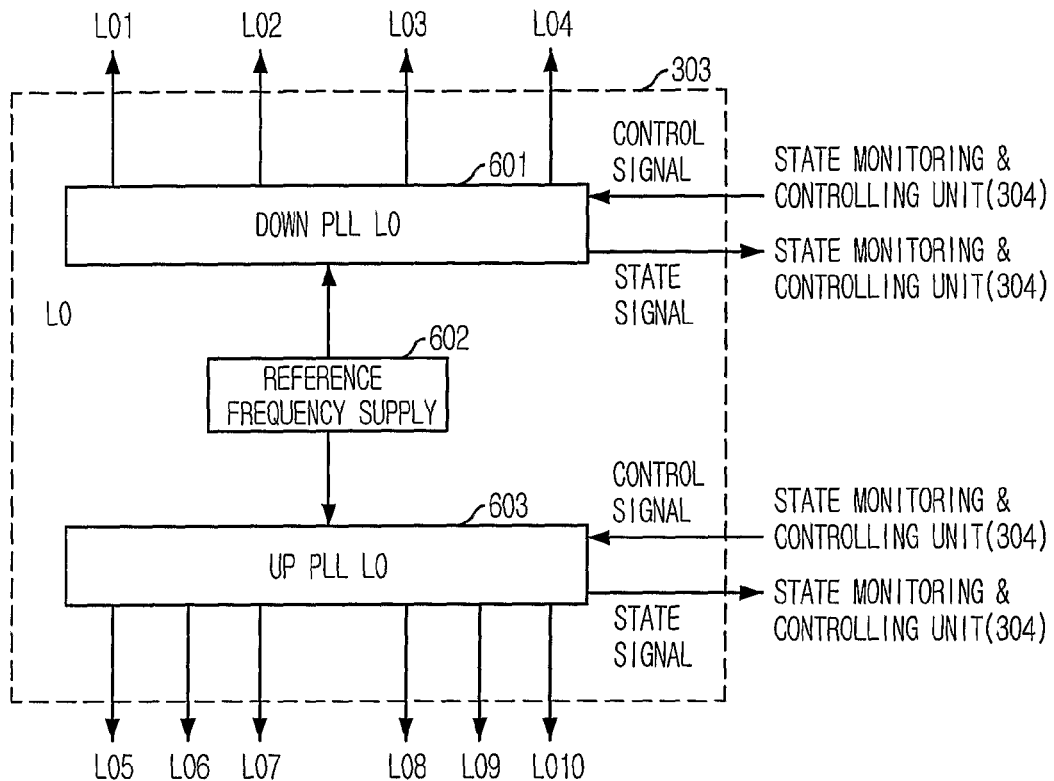
FIG. 7 is a block diagram depicting a local oscillator shown in FIG. 4.

FIG. 7 is a block diagram depicting a local oscillator shown in FIG. 4.

As shown in FIG. 7, the local oscillator 303 includes a downstream phase locked loop (PLL) local oscillator 601, a reference frequency supply 602, and an upstream phase locked loop (PLL) local oscillator 603.

For convenience, four downstream channels and eight upstream channels are shown in FIG. 7. Herein, the eight channels include four channels E, F, G, H using upstream bands from 5 to 42 MHz, and another four channels I, J, K, L using IUC band.

The down PLL local oscillator 601 receives a control signal from the state monitoring and controlling unit 304 and also receives a reference frequency signal from the reference frequency supply 602. The down PLL local oscillator 601 generates local oscillating signals LO0, LO2, LO3, LO4 and outputs the generated local oscillating signals to the down frequency converting and combining unit 302. Also, the down PLL local oscillator 601 outputs local oscillating generation information to the state monitoring and controlling unit 304.

The up PLL local oscillator 603 receives a control signal from the state monitoring and controlling unit 304 and reference frequency signals from the reference frequency supply 602, and generates local oscillating signals LO5, LO6, LO7, LO8, LO9 and LO10. The generated local oscillating signals are outputted to the up frequency converting and combining unit 306. Also, the up PLL local oscillator 603 outputs local oscillating generation information to the state monitoring and controlling unit 603.

Figure 8:
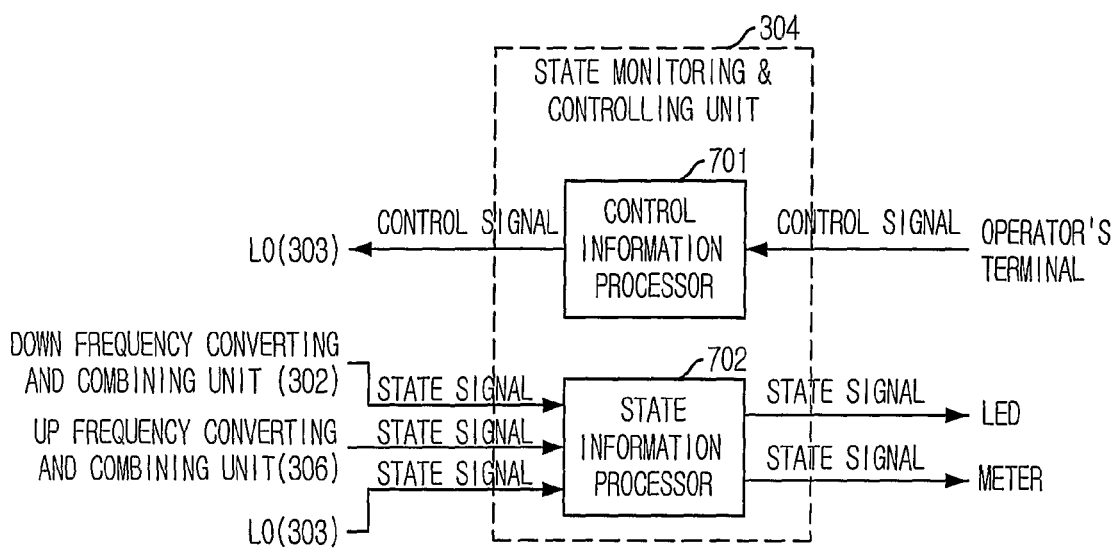
FIG. 8 is a block diagram of a state controlling and monitoring unit shown in FIG. 4.

FIG. 8 is a block diagram of a state controlling and monitoring unit shown in FIG. 4.

As shown, the state monitoring and controlling unit 304 includes a control information processor 701 and a state information processor 702.

The control information processor 701 receives a PLL control signal from an operator's terminal, and transfers the PLL control signal to the local oscillator 303. The state information processor 702 receives state information from the down frequency converting and combining unit 302, the up frequency converting and combining unit 306, and the local oscillator 303, and outputs the input state information to a state display such as LED or to a meter.

Figure 9:
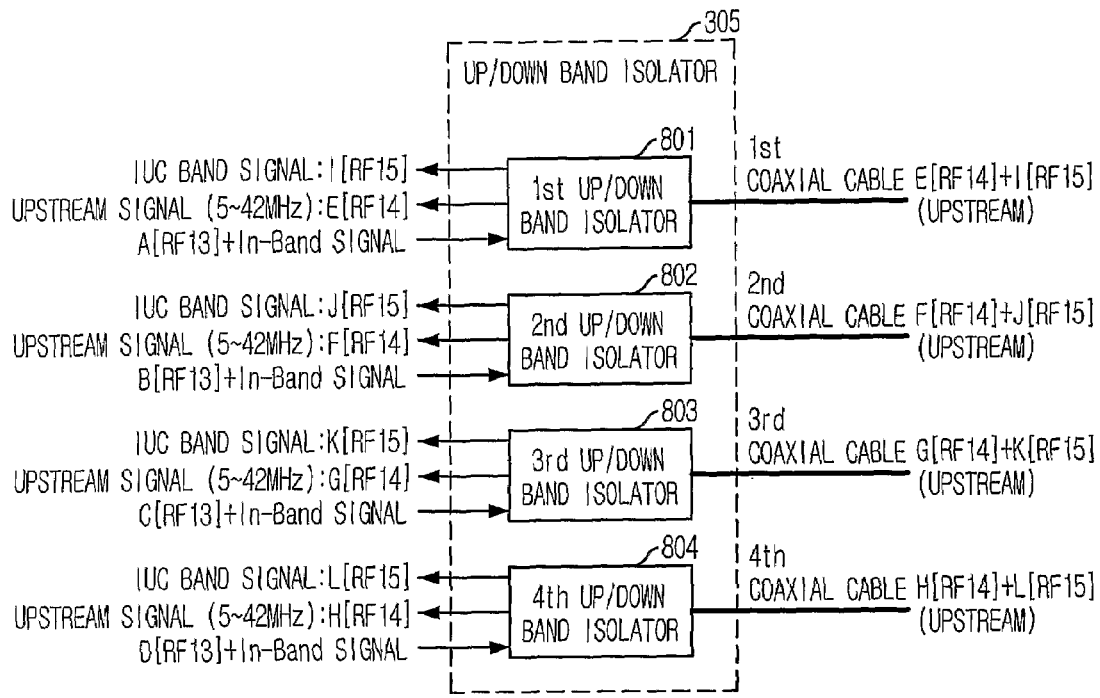
FIG. 9 is a block diagram of an up/down band isolator shown in FIG. 4.

FIG. 9 is a block diagram of an up/down band isolator shown in FIG. 4.

Figure 10:
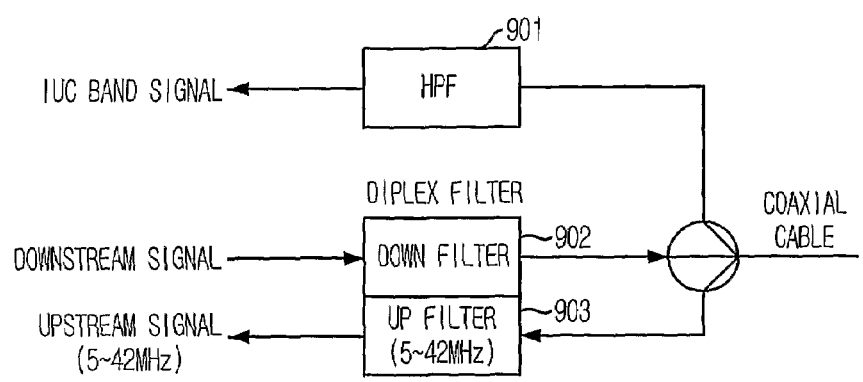
FIG. 10 is a block diagram of an up/down band isolator shown in FIG. 9 in accordance with an embodiment of the present invention.

The first up/down band isolator 801 receives an upstream signal inputted through IUC band and upstream signal band from a first coaxial cable connected to the ONU 224 which is shown as a numeral reference 229 in FIG. 2 (E[RF14]+I[RF15]). The first up/down band isolator 801 isolates the upstream signal into an IUC band signal I[RF15] and signals in upstream signal bands from 5 to 42 MHz E[RF14], and outputs the isolated signals to the up frequency converting and combining unit 306. Also, the first up/down band isolator 801 receives downstream signals and A[RF13] from the down frequency converting and combining unit 306, performs a filtering on the received signals, and outputs the filtered signals to the first coaxial cable as shown in FIG. 10. The downstream signals are broadcasting signals in a coaxial cable usable frequency bands which is the In-Band signal.

FIG. 10 is a block diagram of an up/down band isolator shown in FIG. 9 in accordance with an embodiment of the present invention.

A high-pass filter 901 receives an upstream signal (IUC band signal+upstream signals in 5-42 MHz) transferred through a coaxial cable and outputs the IUC band signal by filtering the upstream signal. An upstream filter 903 of a diplex filter outputs only upstream signals in bands from 5 to 42 MHz among the received upstream signals.

In case of the first up/down band isolator 801, the HPF 901 receives upstream signals (E[RF14]+I[RF15]) through the first coaxial cable, and outputs ICU band signals (I[RF15]) by filtering the received upstream signals. The up filter 903 of the diplex filter outputs the upstream signals in bands from 5 to 42 MHz among the received upstream signals.

Meanwhile, a down filter 902 of the diplex filter receives downstream signal in a coaxial cable usable frequent band, filters the received downstream signal and outputs the filtered signal to the first coaxial cable. In case of the first up/down band isolator 801, the down filter 902 receives downstream signals (E[RF14]+I[RF15]).

Each of the first up/down band isolator 801, the second up/down band isolator 802, the third up/down band isolator 803 and the fourth up/down band isolator 804 shown in FIG. 9 has identical function and configuration compared to the up/down band isolator shown in FIG. 10.

Figure 11:
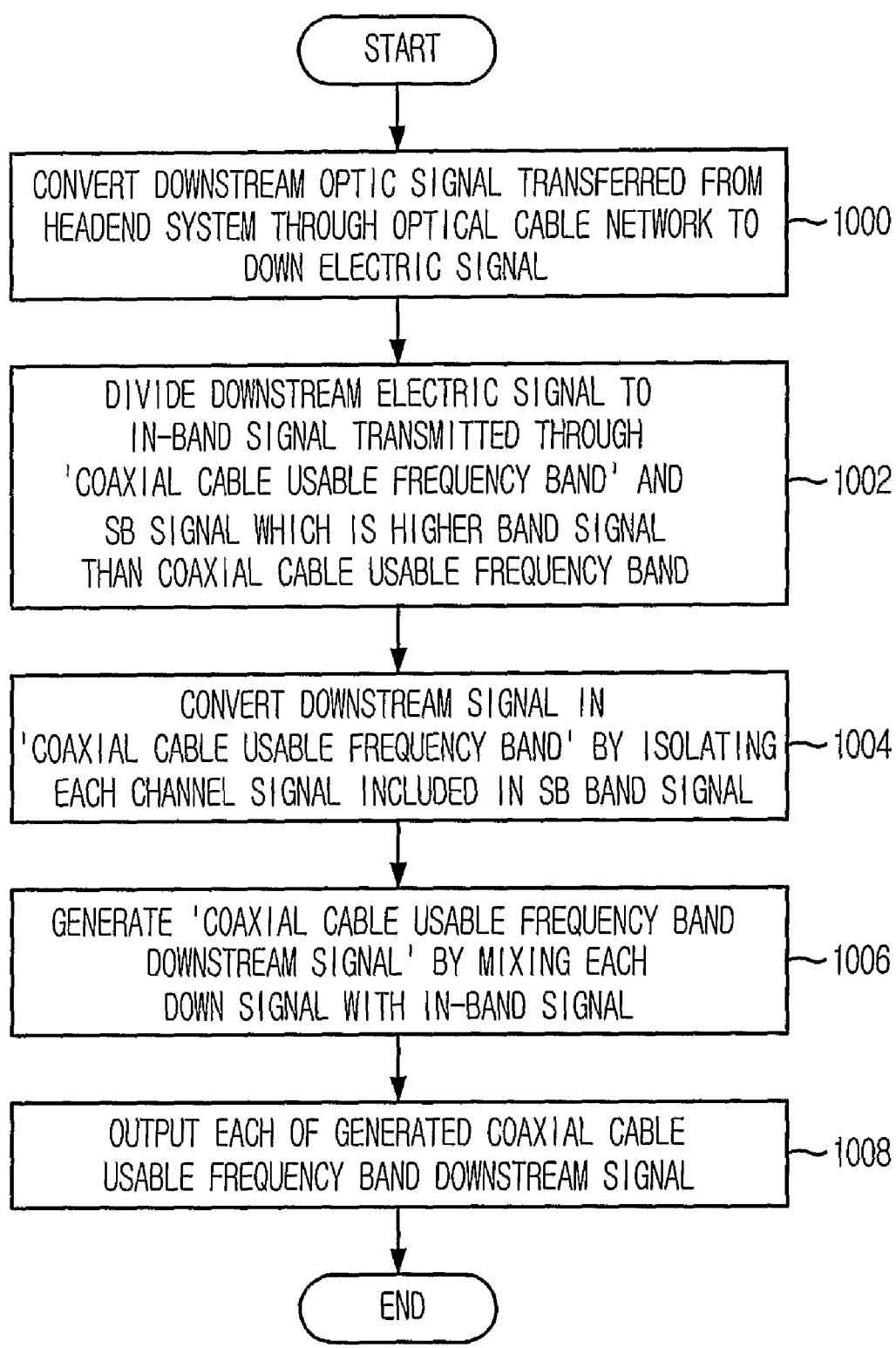
FIGS. 11 and 12 are flowcharts of a method of up/down converting/combining frequency in an outdoor optical node unit in accordance with a preferred embodiment of the present invention.
Figure 12:
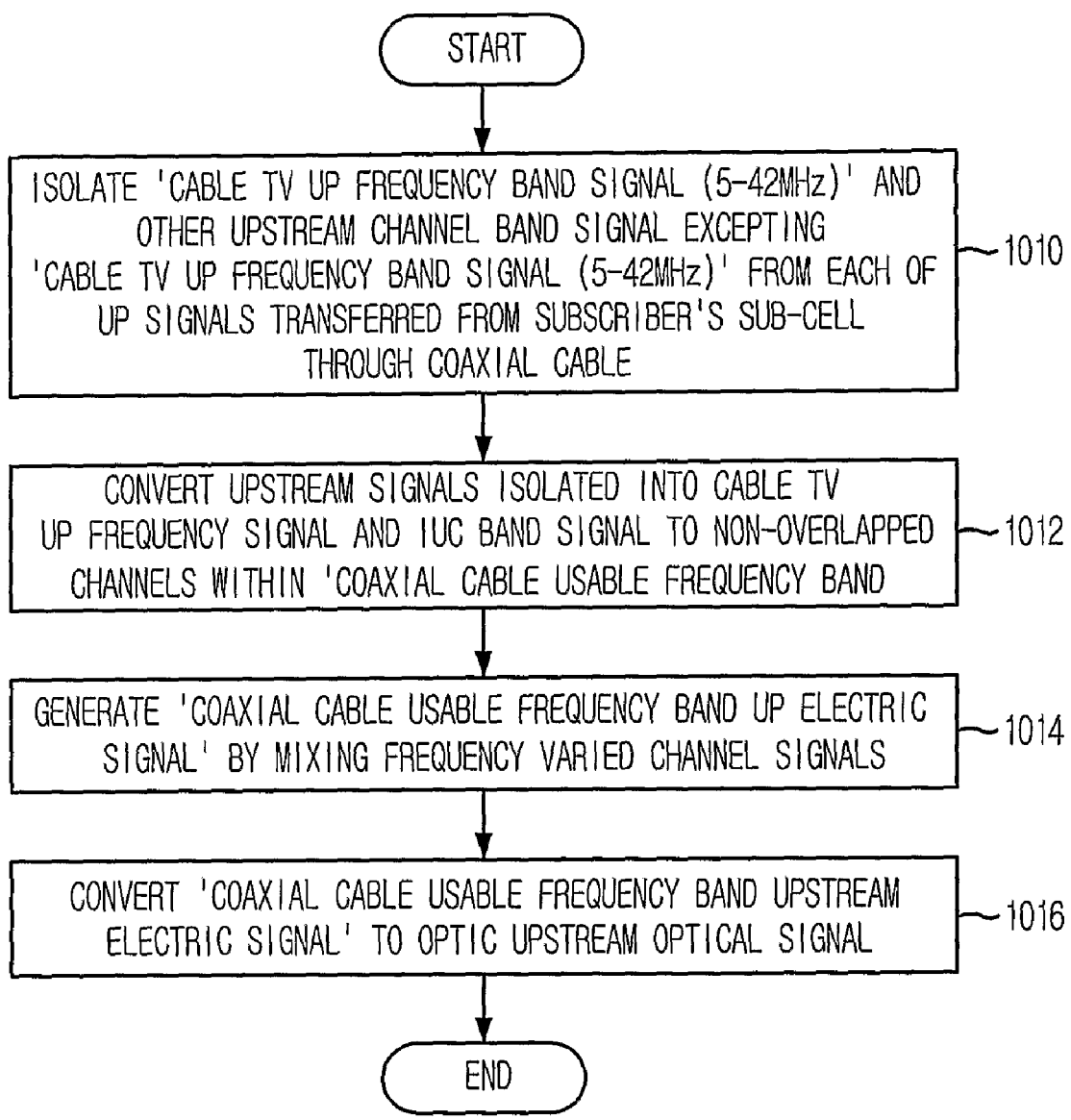

FIGS. 11 and 12 are flowcharts of a method of up/down converting/combining frequency in an outdoor optical node unit in accordance with a preferred embodiment of the present invention. FIG. 11 shows a method of converting/combining a downstream frequency, and FIG. 12 shows a method of converting/combining an upstream frequency. Since the methods shown in FIGS. 11 and 12 are already described in detail while describing the ONU, general steps will be described hereinafter.

At first, the method of converting/combining a downstream frequency will be described with reference to FIG. 11.

The outdoor ONU 224 receives downstream optic signals through the optical cable network 130 from the headend system 100, and converts the downstream optical signals to downstream electric signals at step S1000.

The ONU 224 isolates the down electric signals to In-Band signals transmitted in a coaxial cable usable frequency band and SB signals at step S1002. Herein, the In-Band signals are broadcasting signals in the coaxial cable usable frequency band, and the SB bans signals are band signals higher than the coaxial cable usable frequency band. Each of channel signals include in the SB signals are isolated, and converted to downstream signals in the coaxial cable usable frequency bands at step S1004. After then, downstream signals of coaxial cable usable frequency band are generated by combining the frequency-converted downstream signals to the In-Band signals.

The ONU 224 outputs each of the generated downstream signals in the step S1006 to corresponding coaxial cable at step S1008.

Hereinafter, a method of converting and combining an upstream frequency shown in FIG. 12 will be described.

The ONU 224 receives upstream signals from each of sub cells through a coaxial cable, and isolates each of the upstream signals into 'cable TV upstream frequency band signals', which is signals in bands from 5 to 42 MHz, and other upstream channel band signal in the coaxial cable usable frequency band excepting the cable TV upstream frequency band signals, which are IUC band signals at step S1010.

The ONU 224 converts the isolated upstream signals, which are the cable TV upstream frequency band signals and IUC band signals, to channels not overlapped in the coaxial cable frequency band, and generates 'coaxial cable usable frequency band upstream electric signals by combining the converted upstream signals at step s1014.

The ONU 224 converts the converted upstream signals to upstream optic signals for transmitting the generated coaxial cable usable frequency band upstream electric signals to the headend system through the optical cable at step S1016.

Figure 13:
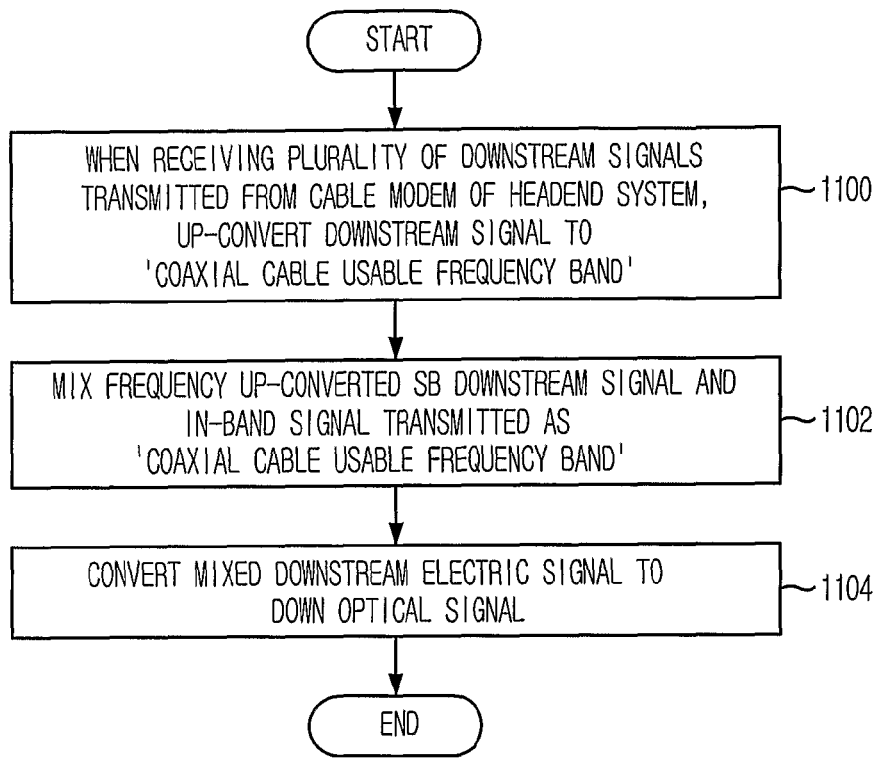
FIGS. 13 and 14 are flowcharts of a method of up/down converting/combining frequency in a cable TV headend system in accordance with a preferred embodiment of the present invention.
Figure 14:
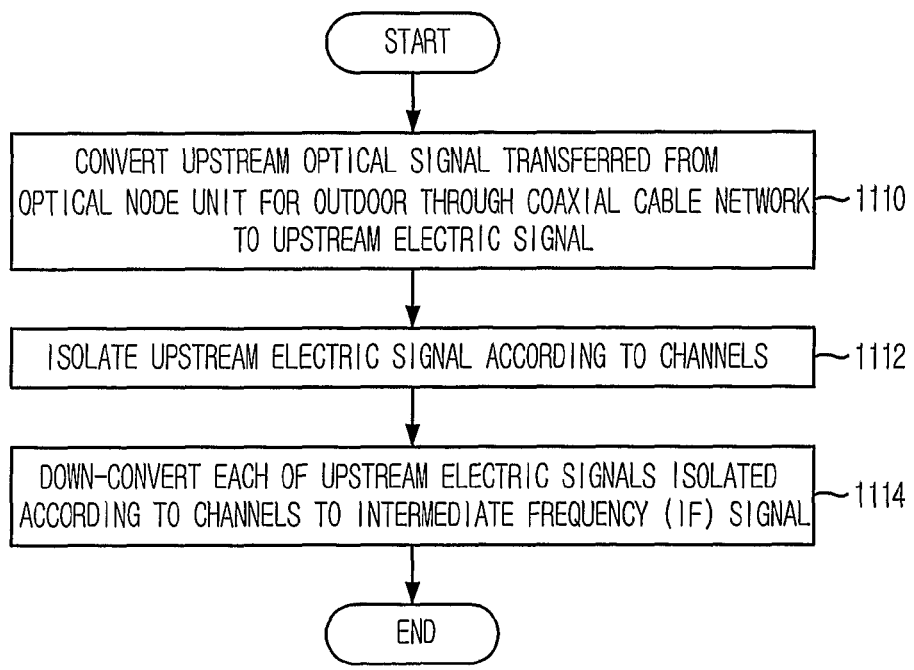

FIGS. 13 and 14 are flowcharts of a method of up/down converting/combining frequency in a cable TV headend system in accordance with a preferred embodiment of the present invention. FIG. 13 shows a method of converting and combining downstream frequency and FIG. 14 shows a method of converting and combining upstream frequency. Since the methods shown in FIGS. 13 and 14 are already described in detail while describing the ONU, general steps will be described hereinafter.

Hereinafter, a method of converting and combining downstream frequency in a cable TV headend system will be described with reference to FIG. 13.

The headend system, which denotes an apparatus 200 for converting/combining a frequency in a headend system, receives a plurality of downstream signals from the cable MODEM 210 and up-converts the received downstream signals to signals in the SB band which is higher than a coaxial cable usable frequency band at step S1100.

The headend system combines the SB band downstream signals generated in the step S1100 and the In-band signal, which is a broadcasting signal in a coaxial cable usable frequency band, transmitted as the coaxial cable usable frequency band at step S1102, and converts the combined downstream electric signal to downstream optic signals for transmitting the combined downstream electric signal through the optical cable network at step S1104.

Hereinafter, a method of converting/combining an upstream frequency signal in a cable TV headend system will be described.

The headend system, which denotes an apparatus 200 for converting/combining a frequency in a headend system, receives an upstream optic signal from the outdoor ONU through an optical cable network, and converts the upstream optic signal to an upstream electric signal at step S1110.

The headend system divides the upstream electric signal according to each of channels at step S1112, and downconverts each of the divided upstream electric signals to intermediate frequency (IF) signals for transmitting the upstream electric signal to the cable MODEM 210 of the headend system at step S1114.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2003-, filed in the Korean Intellectual Property Office on Oct. 2, 2003, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An optical node unit (ONU) of converting and combining a frequency for outdoor in a hybrid fiber coaxial (HFC) network, the optical node unit comprising: a downstream optic-to-electric converting means for converting a downstream optic signal transferred through an optical cable network from a headend system to a downstream electric signal; a down frequency converting and combining means for isolating the downstream electric signal to a broadcasting signal transmitted as a coaxial cable usable frequency band (In-Band signal) and a band signal higher than the coaxial cable usable frequency band (Super-Band (SB) signal), isolating each of channel signals in the SB signal, converting the isolated channel signals to downstream signals in a coaxial cable usable frequency band, and combining each of the frequency-converted downstream signals with the In-Band signal to generate a coaxial cable usable frequency band downstream signal; an up/down band isolating means for outputting each of the coaxial cable usable frequency band downstream signals inputted from the down frequency converting and combining means to a corresponding coaxial cable, or dividing an upstream signal transferred through a coaxial cable from each of subscriber's sub cells to a cable TV upstream frequency band signal and In-Band upstream channel band signal (IUC band signal) which is other upstream channel in a coaxial cable usable frequency band excepting the cable TV upstream frequency band, and outputting the cable TV upstream frequency band signal and the IUC band signal to an upstream frequency converting and combining means; an upstream frequency converting and combining means for converting the upstream signals which are the cable TV upstream frequency band signal and the IUC band signal inputted from the up/down band isolating means to channels not overlapped in the coaxial cable usable frequency band, combining the converted channel signals to generate a coaxial cable usable frequency band upstream electric signal; an up electric-to-optic converting means for receiving the optical cable usable frequency band upstream electric signal, converting the optical cable usable frequency band upstream electric signal to an upstream optical signal, and outputting the upstream optical signal to the headend system through an optical cable network; and a local oscillating means for generating local oscillating signal for frequency-conversion, and providing the generated local oscillating signal to the down frequency converting and combining means or the up frequency converting and combining means.

2. The ONU as recited in claim 1, wherein the down frequency converting and combining means includes: a band isolating means for receiving the down electric signal from the down optic-to-electric converting means and isolating the In-Band signal and the SB signal from the down electric signal; a plurality of down frequency converting means for converting each of channel signals in the SB signal to a downstream signal having a predetermined center frequency in a coaxial cable usable frequency band using a local oscillating signal provided from the local oscillating means; and a plurality of auto-gain controllers for combining each of the downstream signals converted in the down frequency converting means with the In-Band signal isolated at the band isolating means to generate a coaxial cable usable frequency band downstream signal, and controlling a signal level of the generated coaxial cable usable frequency band downstream signal.

3. The ONU as recited in claim 2, wherein the down frequency converting means converts each of channel signals to a signal having a center frequency in bands from 91 MHz to 700 MHz.

4. The ONU as recited in claim 1, wherein the up frequency converting and combining means includes: a band pass filtering means for filtering a cable TV upstream frequency band signal and an IUC band signal from upstream signals of a predetermined sub cell inputted from the up/down band isolating means; a plurality of up-converting means for converting the cable TV upstream frequency signal and the IUC band signal of an upstream signal form sub cells excepting the predetermined sub cell inputted from the up/down band isolating means to other channel signals in the coaxial cable usable frequency band using a local oscillating signal provided from the local oscillating means; a frequency combining means for combining signals outputted from the band pass filtering means and the plurality of up-converting means; and an auto-gain controlling means for controlling a signal level of an upstream signal outputted from the frequency combining means.

5. The ONU as recited in claim 4, further comprising a state monitoring and controlling means for receiving state signals from the down frequency converting and combining means, the up frequency converting and combining means, and the local oscillating means, externally outputting the received state signal, and transferring a control signal to generating a local oscillating signal from an operator to the local oscillating means.

6. The ONU as recited in claim 5, wherein the local oscillating means includes: a reference frequency providing means for providing a reference frequency to generate a local oscillating signal of a predetermined frequency; a down PLL local oscillating means for generating a downstream local oscillating signal according to a reference frequency provided from the reference frequency providing means using a phase locked loop (PLL), and outputting the generated downstream local oscillating signal to the down frequency converting and combining means; and an up PLL local oscillating means for generating an upstream local oscillating signal according to a reference frequency provided from the reference frequency providing means using a PLL, and outputting the generated upstream local oscillating signal to the up frequency converting and combining means.

7. The ONU as recited in claim 6, wherein the up PLL local oscillating means and the down PLL local oscillating means further perform a function for receiving a control signal to generate a local oscillating signal from the state monitoring and controlling means, using the received control signal to generate the local oscillating signal, and transferring state information of the generated local oscillating signal to the state monitoring and controlling means.

8. The ONU as recited in claim 7, wherein the up/down band isolating means includes a plurality of up/down band isolators as many as the number of coaxial cables connected to the ONU, wherein each of the up/down band isolators has: a diplex filter for receiving coaxial cable usable frequency band downstream signals from the down frequency converting and Combining means and filtering the received downstream signals to output each of the received downstream signals to corresponding coaxial cables, or passing only a cable TV upstream frequency band signal in an upstream signal inputted through a corresponding coaxial cable from each of sub cells; and a high pass filter (HPF) for passing only an upstream signal in IUC (In-Band Upstream Channel) band.

9. A method of converting and combining a frequency in an optical node unit for outdoor in a HFC network, the method comprising the steps of: a) converting downstream optic signals transferred from a headend system through an optic cable network to downstream electric signals; b) isolating a broadcasting signal in a coaxial cable usable frequency band (In-Band signal) and a band signal higher than a coaxial cable usable frequency band (Super-Band (SB) signal) from the downstream electric signal, isolating each of channel signals included in the SB signal, converting the isolated channel signals to downstream signal in a coaxial cable usable frequency band, and combining each of the downstream signals with the In-Band signal to generate a coaxial cable usable frequency band downstream signal; and c) outputting each of the coaxial cable usable frequency band downstream signals to a corresponding coaxial cable.

10. The method as recited in claim 9, wherein the step b) includes the step of: b-1) receiving the downstream electric signals and dividing the received the downstream electric signals to the In-Band signal and the SB signal; b-2) converting each of channel signals included in the SB signal to a downstream signal having a predetermined center frequency in a coaxial cable usable frequency band; b-3) generating a coaxial cable usable frequency band downstream signal by combining each of the frequency- converted downstream signals in the step b-2) with the In-Band signal; and b-4) controlling a signal level of the generated coaxial cable usable frequency band downstream signal.

11. A method of converting and combining a frequency in an optical node unit for outdoor in a HFC network, the method comprising the steps of: a) dividing an upstream signal transferred through a coaxial cable from each of subscriber's sub cells to a cable TV upstream frequency band signal and other upstream channel in a coaxial cable usable frequency band excepting the cable TV upstream frequency band which is In-Band upstream channel band signal (IUC band signal); b) converting the upstream signals which are the cable TV upstream frequency band signal and the IUC band signal to channels not overlapped in the coaxial cable usable frequency band, combining the converted channel signals to generate a coaxial cable usable frequency band upstream electric signal; and c) converting the generated coaxial cable usable frequency band upstream electric signal to an upstream optic signal for transmitting the upstream electric signal to the headend system through the optical cable network.

12. The method as recited in claim 11, wherein the step b) includes the steps of: b-1) converting the input upstream signals divided to the cable TV upstream frequency band signal and the IUC band signal at the step a) to channel not to be overlapped in the coaxial cable usable frequency band; b-2) generating the coaxial cable usable frequency band upstream signal by combining the converted channel signals; and b-3) controlling a signal level of the coaxial cable usable frequency band upstream electric signal.

13. The ONU as recited claim 2, wherein the up frequency converting and combining means includes: a band pass filtering means for filtering a cable TV upstream frequency band signal and an IUC band signal from upstream signals of a predetermined sub cell inputted from the up/down band isolating means; a plurality of up-converting means for converting the cable TV upstream frequency signal and the IUC band signal of an upstream signal form sub cells excepting the predetermined sub cell inputted from the up/down band isolating means to other channel signals in the coaxial cable usable frequency band using a local oscillating signal provided from the local oscillating means; a frequency combining means for combining signals outputted from the band pass filtering means and the plurality of up-converting means; and an auto-gain controlling means for controlling a signal level of an upstream signal outputted from the frequency combining means.

14. The ONU as recited claim 3, wherein the up frequency converting and combining means includes: a band pass filtering means for filtering a cable TV upstream frequency band signal and an IUC band signal from upstream signals of a predetermined sub cell inputted from the up/down band isolating means; a plurality of up-converting means for converting the cable TV upstream frequency signal and the IUC band signal of an upstream signal form sub cells excepting the predetermined sub cell inputted from the up/down band isolating means to other channel signals in the coaxial cable usable frequency band using a local oscillating signal provided from the local oscillating means; a frequency combining means for combining signals outputted from the band pass filtering means and the plurality of up-converting means; and an auto-gain controlling means for controlling a signal level of an upstream signal outputted from the frequency combining means.

* * * * *